US009886079B2

United States Patent
Ito

(10) Patent No.: US 9,886,079 B2
(45) Date of Patent: Feb. 6, 2018

(54) INFORMATION PROCESSING APPARATUS AND METHOD FOR SUPPLYING POWER TO INFORMATION PROCESSING APPARATUS

(71) Applicant: CANON KABUSHIKI KAISHA, Tokyo (JP)

(72) Inventor: Hiroki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 14/552,386

(22) Filed: Nov. 24, 2014

(65) Prior Publication Data

US 2015/0153815 A1 Jun. 4, 2015

(30) Foreign Application Priority Data

Nov. 29, 2013 (JP) .................................. 2013-247500

(51) Int. Cl.
G06F 1/32 (2006.01)
G06F 1/30 (2006.01)

(52) U.S. Cl.
CPC .............. *G06F 1/3287* (2013.01); *G06F 1/30* (2013.01); *G06F 1/3228* (2013.01); *G06F 1/3284* (2013.01); *Y02B 60/1267* (2013.01); *Y02B 60/1282* (2013.01)

(58) Field of Classification Search
None
See application file for complete search history.

(56) References Cited

U.S. PATENT DOCUMENTS

| 2012/0331313 A1* | 12/2012 | Yoshioka | ................ G06F 1/263 |
| | | | 713/300 |
| 2013/0111237 A1* | 5/2013 | Inukai | .................... H02M 7/06 |
| | | | 713/320 |
| 2014/0143562 A1* | 5/2014 | Sunagawa | ............... G06F 1/263 |
| | | | 713/300 |

FOREIGN PATENT DOCUMENTS

| CN | 101447666 A | 6/2009 |
| CN | 101552457 A | 10/2009 |
| CN | 102244709 A | 11/2011 |
| CN | 103095160 A | 5/2013 |
| JP | 2005-011186 A | 1/2005 |
| JP | 2009-213042 A | 9/2009 |
| KR | 10-2011-0055041 A | 5/2011 |
| KR | 10-2012-0135059 A | 12/2012 |

\* cited by examiner

*Primary Examiner* — Kim Huynh
*Assistant Examiner* — Joshua Neveln
(74) *Attorney, Agent, or Firm* — Canon U.S.A., Inc. IP Division

(57) ABSTRACT

An information processing apparatus includes a first power supply unit that generates a first power to be supplied to a first power supply system device, a second power supply unit that generates a second power to be supplied to a second power supply system device, a third power supply unit that generates a third power to be supplied to a third power supply system device from the power generated by the second power supply unit, a first monitoring unit that monitors a state of the third power, and a power supply control unit that performs control so that, in a case where a trouble occurs in the second power supply system device after power is supplied to the second power supply system device, the power supply to the second power supply system device is stopped.

16 Claims, 6 Drawing Sheets

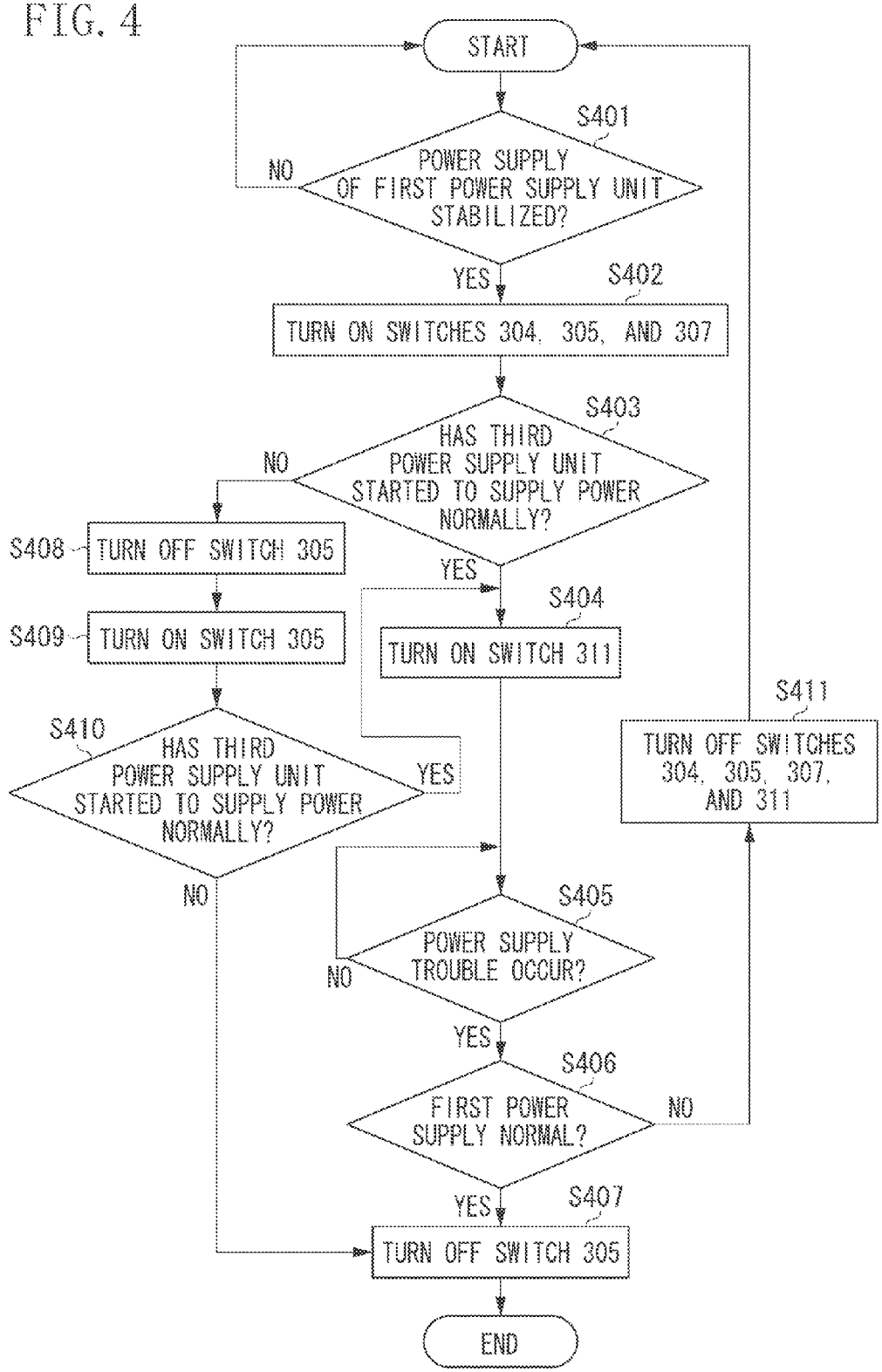

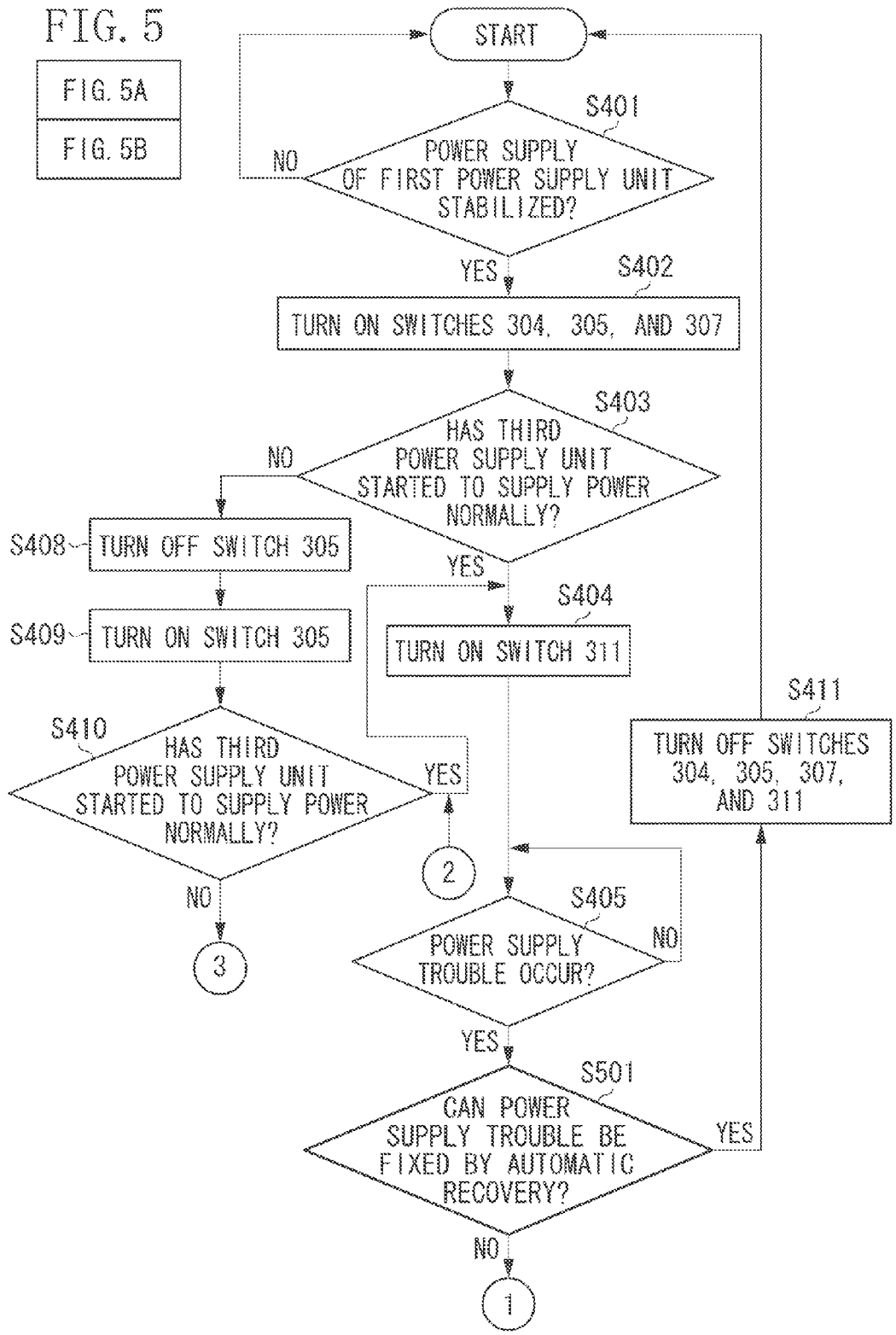

INFORMATION PROCESSING APPARATUS AND METHOD FOR SUPPLYING POWER TO INFORMATION PROCESSING APPARATUS

BACKGROUND

Field

Aspects of the present invention generally relate to an information processing apparatus and a method for supplying power to an information processing apparatus.

Description of the Related Art

An information processing apparatus, such as an image forming apparatus, supplies power to predetermined sections when a power supply switch is turned on by a user or when starting up from a power saving mode, and performs start-up processing. However, when the power supply switch is turned on or when starting up from a power saving mode, an inrush current is produced based on the startup of the power supply circuit and the load of the powered-on sections.

In some cases, a commercial power supply source cannot stably supply power. For example, during a power outage, a momentary voltage drop, or a transient state of voltage when the power supply switch is turned on, power cannot be stably supplied to devices that are connected downstream.

With a commercial power supply source that is in such a state, due to the inrush current of the image forming apparatus, a protection function, such as overcurrent protection function or undervoltage-lockout (UVLO) function, acts on the power supply circuits in the image forming apparatus, which can cause the output of the power supply circuit to remain stopped.

For the safety of the device, these protection functions stop and latch the output of the power supply circuit when a trouble is detected. Consequently, the output of the power supply circuit remains stopped. In order to recover the power supply, it is necessary to turn off and turn on again the power supply of the power supply circuits.

For example, Japanese Patent Application Laid-Open No. 2009-213042 discusses that, if a trouble has occurred in the power supply of a commercial power supply source, the trouble in the commercial power supply source is detected, and automatic recovery processing is performed based on whether there was a trouble in the commercial power supply source when the power supply from the commercial power supply source was restored, and on the device state.

However, in a technique discussed in Japanese Patent Application Laid-Open No. 2009-213042, there is a drawback that in a case where a trouble occurred in a power supply circuit in the apparatus due to the trouble in the commercial power supply source is a trouble that power supply cannot be automatically recovered by turning the device on and off, a meaningless OFF/ON operation is repeated by the automatic recovery processing.

SUMMARY

Aspects of the present invention are generally directed to an information processing apparatus, and a method for supplying power to an information processing apparatus, capable of preventing the repetition of OFF/ON control on a specific power supply unit by specifying that a trouble in which power supply cannot be automatically recovered occurred in a power supply unit supplying power to any of the power supply systems.

According to an aspect of the present invention, an information processing apparatus includes a first power supply unit configured to generate first power to be supplied to a first power supply system device, a second power supply unit configured to generate second power to be supplied to a second power supply system device, a third power supply unit configured to generate third power to be supplied to a third power supply system device from the power generated by the second power supply unit, a first monitoring unit configured to monitor a state of the third power generated by the third power supply unit, a control unit configured to perform control so that, in a case where the state of the third power is normal, power is supplied from the second power supply unit to the second power supply system device, and a power supply control unit configured to perform control so that, in a case where a trouble occurs in the second power supply system device after the control unit has performed control so that power is supplied to the second power supply system device, the power supply to the second power supply system device is stopped.

Further features of the present disclosure will become apparent from the following description of exemplary embodiments with reference to the attached drawings.

BRIEF DESCRIPTION OF THE DRAWINGS

FIG. 4 is a flowchart illustrating a method for controlling an image forming apparatus.

DESCRIPTION OF THE EMBODIMENTS

Various exemplary embodiments will be described in detail below with reference to the drawings.

Description of System Configuration

Figure 1:
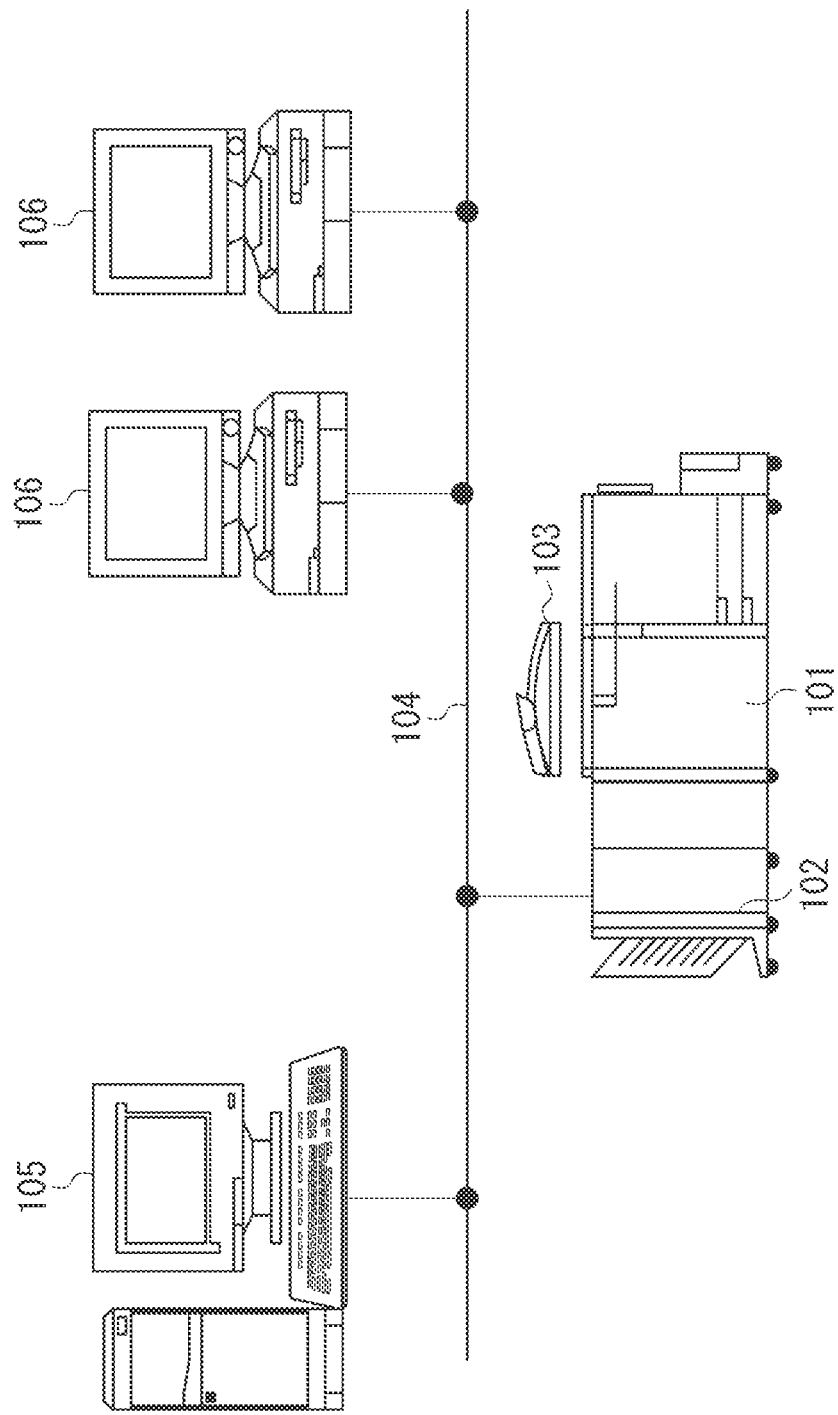
FIG. 1 illustrates an example of an image forming system.

FIG. 1 illustrates an example of an image forming system according to a first exemplary embodiment. This example is a system example in which a server apparatus and a client personal computer (PC) are connected to an image forming apparatus on a network.

In FIG. 1, an image printing unit 101 processes various types of input data, and performs image printing on recording paper. A finishing unit 102 sorts, staples, and folds an output print product based on a desired output format.

A reading apparatus 103 acquires a document image by reading an original document. A print server 105 receives a print request from a client PC 106 connected via a network 104, and transmits a print job to the image printing unit 101. The image printing unit 101 is connected to the print server 105 and the client PC 106 via the network 104.

A user generates on the client PC 106 a print job for printing an image, and executes print processing. In this way, the print job is transmitted to the image printing unit 101 via the print server 105 and the network 104.

Figure 2:
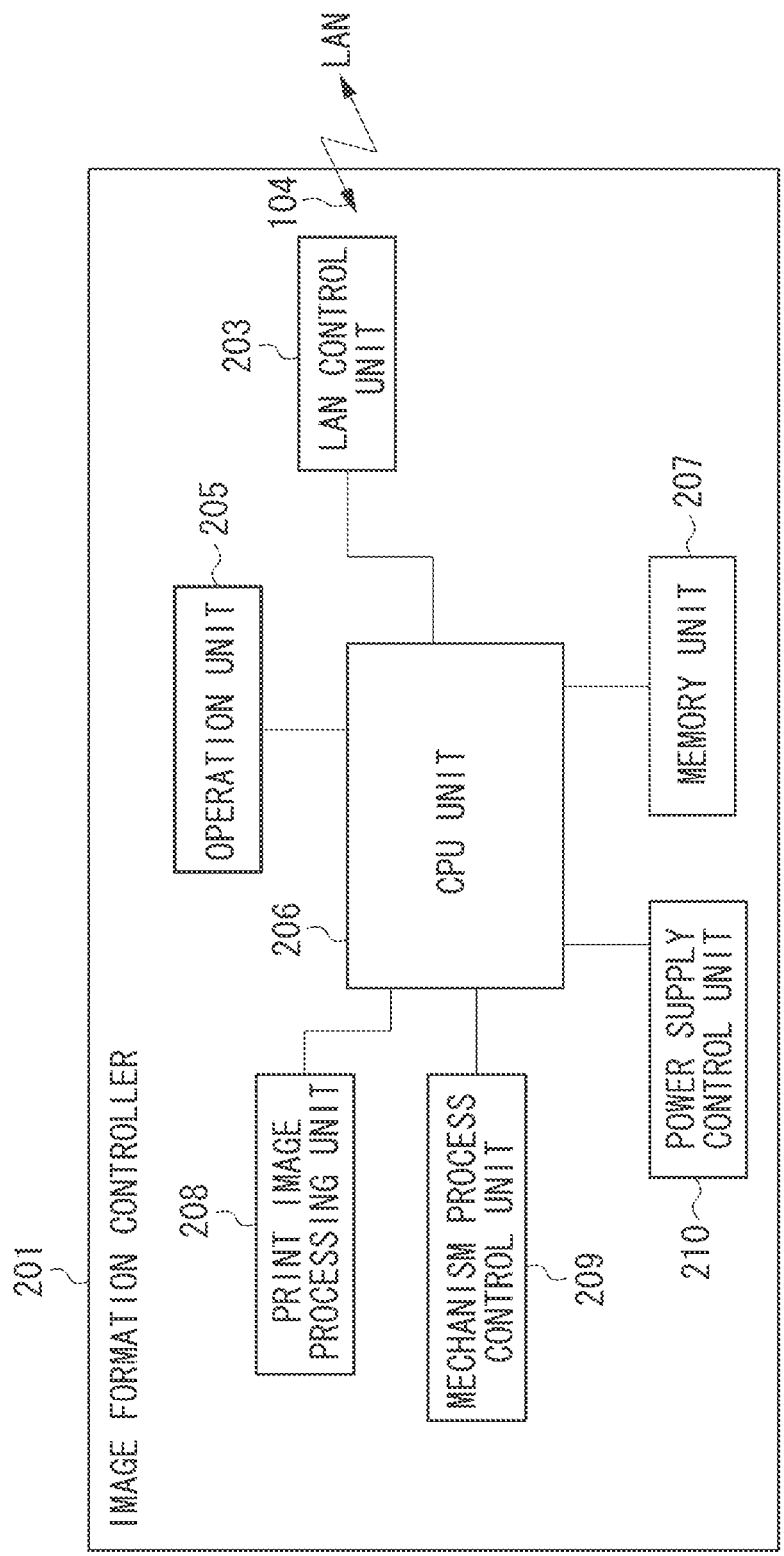
FIG. 2 is a block diagram illustrating a control configuration of an image forming apparatus.

FIG. 2 is a block diagram illustrating a control configuration of the image forming apparatus illustrated in FIG. 1.

In FIG. 2, an image formation controller 201 is included in the image printing unit 101. In the present exemplary embodiment, a local area network (LAN) is used for the network 104 (hereinafter, referred to as "LAN 104"). The LAN 104 is connected to the print server 105 and the client PC 106 illustrated in FIG. 1 for performing LAN communication.

A LAN control unit 203 controls communication with the LAN 104. More specifically, the LAN control unit 203 receives image data (e.g., page description language (PDL) data) received and input via the LAN 104, and transmits various image data in the system and apparatus information via the LAN 104.

An operation unit 205 is a user interface that includes an operation panel for allowing a user to make various operations, and a display device for displaying operation information. A central processing unit (CPU) unit 206 is a processing unit that controls each of the units in the image formation controller 201. Further, the CPU unit 206 reads image data (e.g., PDL data) received and input via the LAN 104, and rasterizes the read image data into bitmap data.

A memory unit 207 is, in the apparatus according to the present exemplary embodiment, a storage device that can be accessed by the CPU unit 206. The memory unit 207 also includes a program memory that stores program for performing various controls. Further, the memory unit 207 is used to store images during image formation. The memory unit 207 includes, for example, a read-only memory (ROM), a random-access memory (RAM), or a hard disk drive (HDD).

A print image processing unit 208 converts the bitmap data rasterized by the CPU unit 206 into print data by performing image processing for printing, such as screen processing. A mechanism process control unit 209 performs printing and recording paper conveyance control by controlling the image printing unit 101 and the finishing unit 102 illustrated in FIG. 1 when printing an image on a sheet such as paper. In the print processing by the image printing unit 101 and the recording paper discharge processing by the finishing unit 102, the printing on the sheet, and the sheet conveyance mechanism are entirely controlled by the mechanism process control unit 209.

A power supply control unit 210 includes, for example, a CPU, and a programmable logic device (PLD). The power supply control unit 210 performs ON/OFF control of a power supply (not illustrated in FIG. 1) when the CPU unit 206 is not powered on. Further, the power supply control unit 210 performs ON/OFF control to each unit under the control of the CPU unit 206 when the CPU unit 206 is powered on. The power supply control unit 210 may control power supply by the CPU executing a program, or control power supply by operating a state machine based on hard logic with a PLD.

Figure 3:
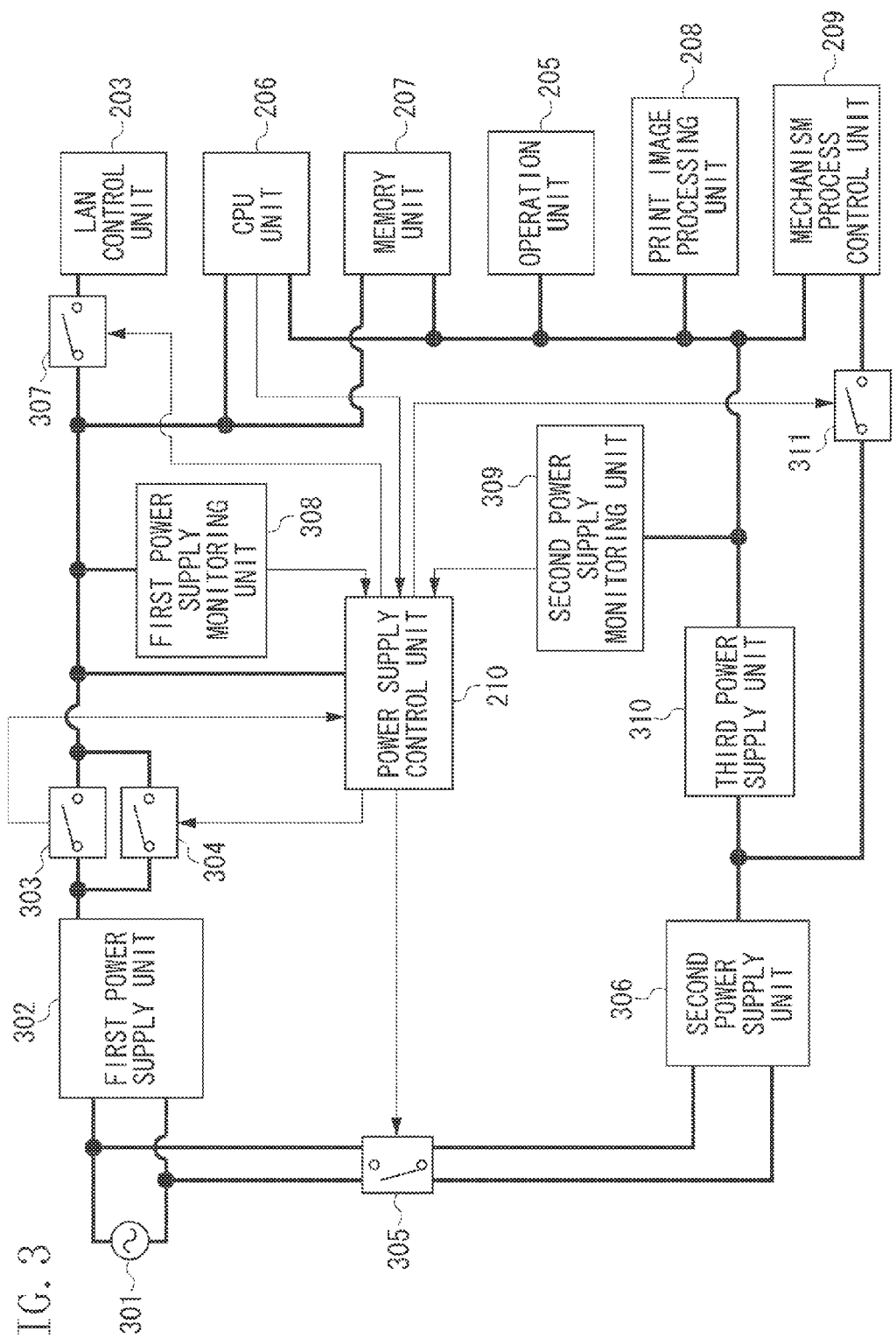
FIG. 3 is a block diagram illustrating a power supply block configuration of an image forming system.

FIG. 3 is a block diagram illustrating a power supply block configuration of an image forming system according to the present exemplary embodiment. The configuration of the power supply system will be described below.

The power supply block configuration illustrated in FIG. 3 includes a commercial power supply source 301. The image forming system receives power supply from the commercial power supply source 301, and supplies power to each of the internal units, such as the image printing unit 101 and the finishing unit 102. A first power supply unit 302, which is connected to the commercial power supply source 301, is constantly powered on as long as it is connected via a power supply cable to the commercial power supply source 301. Further, the first power supply unit 302 converts the power supply received from the commercial power supply source 301 from alternating current (AC) into direct current (DC), and forms a DC power supply with a comparatively low voltage, such as 3.3 V, 1.8 V, or 1.2 V. The first power supply unit 302 supplies the converted DC power to each connected unit.

A switch 303, which is a relay switch, is a main power switch accessible by the user. A switch 304 is a switch for continuing the supply of power to the power supply control unit 210 when the switch 303 has been turned off by the user. When the switch 303 is turned off by the user, the CPU unit 206 detects via the power supply control unit 210 that the switch 303 has been turned off, and starts shutdown processing by the software running on the CPU unit 206. After the shutdown processing by the software running on the CPU unit 206 has finished, the power supply control unit 210 turns off the switch 304. Consequently, both the switches 303 and 304 are turned off, and the power supply from the first power supply unit 302 is cut.

A second power supply unit 306 is connected to the commercial power supply source 301 via a switch 305. The second power supply unit 306 is powered on by turning the switch 305 on and off under the control of the software operating on the power supply control unit 210 on the CPU unit 206. Further, the second power supply unit 306 converts the power supply received from the commercial power supply source 301 from AC to DC, and forms a DC power supply with a comparatively high voltage, such as 24 V. The second power supply unit 306 supplies the converted DC power to each connected unit.

A third power supply unit 310, which is connected to the second power supply unit 306, converts the DC power supply received from the second power supply unit 306 into a DC power supply with a comparatively low voltage, such as 12 V, 5 V, 3.3 V 1.8 V, or 1.2 V. The third power supply unit 310 supplies this DC power to each connected unit.

The power supply control unit 210 controls the power supply from the first power supply unit 302, the power supply from the second power supply unit 306, and the power supply from the third power supply unit 310 by controlling the ON/OFF of the switches 304, 305, 307, and 311.

A first power supply monitoring unit 308 monitors a power supply state of the first power supply unit 302. A second power supply monitoring unit 309 monitors a power supply state of the third power supply unit 310. The CPU unit 206 is connected to the first power supply unit 302 via the switch 303. The CPU unit 206 has a function of suppressing power consumption by stopping an operating clock in a power saving mode. The LAN control unit 203 is connected to the first power supply unit 302 via the switches 303 and 307.

In a case where the switch 303 is turned on by the user in a state in which the image forming system is powered off, power is supplied from the first power supply unit 302 via the switch 303 to the power supply control unit 210, a part of the CPU unit 206, and a part of the memory unit 207. Then, in a case where the first power supply monitoring unit 308 detects that the power supply has stabilized, a power good signal is output from the first power supply monitoring unit 308 to the power supply control unit 210.

The power supply control unit 210 receives the power good signal from the first power supply monitoring unit 308, and turns on the switches 304, 305, and 307. Consequently, power is supplied from the first power supply unit 302 to the LAN control unit 203. Further, power is supplied from the second power supply unit 306 to the third power supply unit 310, and power is supplied from the third power supply unit 310 to the CPU unit 206, the memory unit 207, the operation unit 205, the print image processing unit 208, and a part of the mechanism process control unit 209.

Then, in a case where the second power supply monitoring unit 309 detects that the power supply has stabilized, a power good signal is output from the second power supply monitoring unit 309 to the power supply control unit 210. The power supply control unit 210 receives the power good signal from the second power supply monitoring unit 309, and turns on the switch 311. Consequently, power is supplied from the second power supply unit 306 to the mechanism process control unit 209 via the switch 311. Through the above operations, power is supplied to the image forming system, and the image forming system is powered on.

The first power supply monitoring unit 308 and the second power supply monitoring unit 309 monitor the voltages of the first power supply unit 302 and the third power supply unit 310, respectively. In a case where it is detected that the output voltage exceeds a threshold, the first power supply monitoring unit 308 and the second power supply monitoring unit 309 output a power good signal to the power supply control unit 210. On the other hand, in a case where it is detected that the output voltage is below the threshold, the first power supply monitoring unit 308 and the second power supply monitoring unit 309 do not output the power good signal.

Further, in a case where the image forming system has not performed a print job for a predetermined period of time, the system shifts to a power saving mode. In a case where a print job has not been detected for a predetermined period with a timer (not illustrated), the CPU unit 206 starts to shift the mode to a power saving mode. To shift the mode to the power saving mode, the CPU unit 206 controls the power supply control unit 210 to turn off the switches 305 and 311. The power supply control unit 210 receives an instruction from the CPU unit 206, and turns off the switches 305 and 311. By turning off the switches 305 and 311, power from the second power supply unit 306 and the third power supply unit 310 is cut, and the image forming system shifts to the power saving mode.

The power supply control unit 210 can independently control the switch 307. Thus, in a case where a print job is received via the LAN 104 during the power saving mode, and the power supply control unit 210 needs to start up from the power saving mode, the power supply control unit 210 can receive the print job via the LAN 104 and start up by supplying power to the LAN control unit 203.

When the print job is received via the LAN 104, the LAN control unit 203 issues a startup notification to the power supply control unit 210. This causes the power supply control unit 210 to issue a startup notification to the CPU unit 206. Then, the CPU unit 206 starts up, detects that there is a print job, and executes the print job. When a print job has been input by the user, in order to detect and execute the print job, the CPU unit 206 controls the power supply control unit 210 to turn on the switches 305 and 311. The power supply control unit 210 receives an instruction from the CPU unit 206, and turns on the switches 305 and 311. By turning on the switch 305, power is supplied from the second power supply unit 306 to the print image processing unit 208. Further, by turning on the switch 311, power is supplied from the second power supply unit 306 to the mechanism process control unit 209.

The mechanism process control unit 209 is connected to the second power supply unit 306 via the switch 311. The power supply control unit 210, which is controlled by the CPU unit 206, can independently control the switch 311. When printing is not performed, in order for the CPU unit 206 to turn off the mechanism process control unit 209, the power supply control unit 210 turns off the switch 311, thereby suppressing unnecessary power consumption. In this way, to suppress unnecessary power consumption, each of the switches can be independently controlled.

FIG. 4 is a flowchart illustrating a method for controlling the image forming apparatus according to the present exemplary embodiment. The flowchart illustrates a flow in which the power supply of the whole image forming system is turned on from an off state by the power supply control unit 210 controlling the power supply of the image forming system when the switch 303 is turned on by the user.

When the switch 303 is turned on by the user, power starts to be supplied from the first power supply unit 302 via the switch 303 to the power supply control unit 210, a part of the CPU unit 206, and a part of the memory unit 207. The first power supply monitoring unit 308 monitors the output voltage of the first power supply unit 302. When the required power is supplied to the power supply control unit 210, and the reset of the power supply control unit 210 itself is released, the processing flow illustrated in FIG. 4 starts. Each step in the processing flow is realized by the power supply control unit 210 executing a stored program.

In step S401, in a case where the first power supply monitoring unit 308 detects that the power supply of the first power supply unit 302 has stabilized, a power good signal is output from the first power supply monitoring unit 308 to the power supply control unit 210. The power supply control unit 210 receives the power good signal from the first power supply monitoring unit 308, and determines that the first power supply unit 302 has started up normally. In a case where the power supply control unit 210 determines that the first power supply unit 302 has started up normally (YES in step S401), the processing proceeds to step S402.

On the other hand, in a case where the power supply control unit 210 determines that the first power supply unit 302 has not started up normally (NO in step S401), the processing returns to step S401. In step S402, the power supply control unit 210 turns on the switches 304, 305, and 307. By turning on the switch 307, power is supplied from the first power supply unit 302 to the LAN control unit 203.

By turning on the switch 305, power is supplied from the commercial power supply source 301 to the second power supply unit 306. Then, power is further supplied from the second power supply unit 306 to the third power supply unit 310, and then also from the third power supply unit 310 to the CPU unit 206, the memory unit 207, the operation unit 205, the print image processing unit 208, and a part of the mechanism process control unit 209. The second power supply monitoring unit 309 monitors the output voltage of the third power supply unit 310.

In step S403, in a case where the second power supply monitoring unit 309 detects that the output voltage of the third power supply unit 310 exceeds a threshold, the second power supply monitoring unit 309 outputs a power good signal to the power supply control unit 210. The power supply control unit 210 receives the power good signal from the second power supply monitoring unit 309, and determines that the third power supply unit 310 has started up normally.

Further, the power supply control unit 210, which has a timer (not illustrated), measures the period of time from when the switch 305 is turned on until when a power good signal from the second power supply monitoring unit 309 is received. In a case where the power good signal from the second power supply monitoring unit 309 is not received within a predetermined period of time after the switch 305 was turned on, the power supply control unit 210 determines that a trouble has occurred in the second power supply unit 306 or the third power supply unit 310.

In a case where the power supply control unit 210 determines that the third power supply unit 310 has started up normally (YES in step S403), the processing proceeds to step S404. On the other hand, in a case where the power supply control unit 210 determines that the third power supply unit 310 has not started up normally (NO in step 403), the processing proceeds to step S408.

In step S404, the power supply control unit 210 turns on the switch 311. By turning on the switch 311, power is supplied from the second power supply unit 306 to the mechanism process control unit 209, and the image forming system is powered on. Consequently, the user can use functions such as printing.

In step S405, the power supply control unit 210 monitors whether a trouble has occurred in the first power supply unit 302, the second power supply unit 306, or the third power supply unit 310 based on a power good signal from the first power supply monitoring unit 308 and the second power supply monitoring unit 309.

In a case where the power supply control unit 210 determines that a trouble has occurred in any of the first power supply unit 302, the second power supply unit 306, and the third power supply unit 310 (YES in step S405), the processing proceeds to step S406.

In step S406, the power supply control unit 210 determines whether, based on the power good signal from the first power supply monitoring unit 308 and the second power supply monitoring unit 309, the power supply trouble detected in step S405 is a power supply trouble only in the second power supply unit 306 and the third power supply unit 310, or also in the first power supply unit 302.

In a case where the power supply control unit 210 determines that the detected power supply trouble is a power supply trouble occurred only in the second power supply unit 306 and the third power supply unit 310 (YES in step S406), the power supply control unit 210 determines that the detected power supply trouble is a power supply trouble that cannot be automatically fixed, and the processing proceeds to step S407.

Further, in a case where the power supply control unit 210 determines that the detected power supply trouble is a trouble not only in the second power supply unit 306 and the third power supply unit 310, but also in the first power supply unit 302 (NO in step S406), the power supply control unit 210 determines that the detected power supply trouble is a power supply trouble that can be automatically fixed, and the processing proceeds to step S411.

In step S407, the power supply control unit 210 turns off the switch 305 to turn off the second power supply unit 306 and the third power supply unit 310.

On the other hand, in step S408, the power supply control unit 210 turns off (off state) the switch 305 to turn off the power supply to the second power supply unit 306 and the third power supply unit 310.

In step S409, the power supply control unit 210 keeps the power supply turned off until charge has been drained from the second power supply unit 306 and the third power supply unit 310. For example, the power supply control unit 210 keeps the switch 305 turned off while measuring one second with a timer. After the power supply off period has elapsed, the power supply control unit 210 then turns on the switch 305 to turn on again (on state) the second power supply unit 306 and the third power supply unit 310.

Further, in step S410, similar to the first time the power supply was turned on, the power supply control unit 210 measures the period of time from when the switch 305 is turned on until when a power good signal from the second power supply monitoring unit 309 is received. In a case where the power supply control unit 210 receives a power good signal from the second power supply monitoring unit 309, and determines that the second power supply unit 306 and the third power supply unit 310 have started up normally (YES in step S410), the processing proceeds to step S404.

In a case where a power good signal from the second power supply monitoring unit 309 is not received within a predetermined period of time after the switch 305 is turned on, the power supply control unit 210 determines that a trouble has occurred in the second power supply unit 306 and the third power supply unit 310, and that this trouble is a power supply trouble that cannot be automatically fixed (NO in step S410), the processing proceeds to step S407.

In step S411, the power supply control unit 210 turns off the switches 304, 305, 307, and 311, and the processing returns to step S401.

There are several reasons why a trouble of a power supply occurs. Power supply can be automatically recovered in some cases, and cannot be automatically recovered in some cases.

For example, an example of a case in which power supply can be automatically recovered includes a case in which there is a period during which the commercial power supply source 301 cannot stably supply power. During the period that the commercial power supply source 301 cannot stably supply power, a trouble can occur in the power supply due to the flow of an inrush current produced when the power supply to the image forming system is turned on or during startup from a power saving mode. At this stage, at the commercial power supply source 301, if there is a momentary voltage drop or a transient state of the voltage when the power supply is turned on, power cannot be stably supplied to devices that are connected downstream.

If the commercial power supply source 301 is in such a state, due to the inrush current of the image forming system, a protection function, such as overcurrent protection or UVLO, acts on the power supply circuits in the image forming system, which can cause the output of the power supply circuits to remain stopped. Examples of the power supply circuits in the present exemplary embodiment include the first power supply unit 302, the second power supply unit 306, and the third power supply unit 310. Consequently, output of the power supply circuits remains stopped. In order to automatically recover the power supply, it is necessary to turn off and turn on again the power supply of the power supply circuits as performed in steps S408 and S409.

According to the above method, when a power supply trouble occurs in an image forming apparatus, the trouble can be automatically fixed if it is a trouble that can be automatically fixed, and if it is a trouble that cannot be automatically fixed, the repetition of a meaningless OFF/ON operation resulting from an unnecessary automatic recovery operation can be avoided.

A description relating to the configuration diagrams and flowchart diagrams described according to the first exemplary embodiment will be omitted. The difference between a second exemplary embodiment and the first exemplary embodiment is in the flow of FIG. 4. More specifically, the method for determining whether a power supply trouble is a trouble that can be automatically fixed is different from that in the first exemplary embodiment.

Figure 5B:
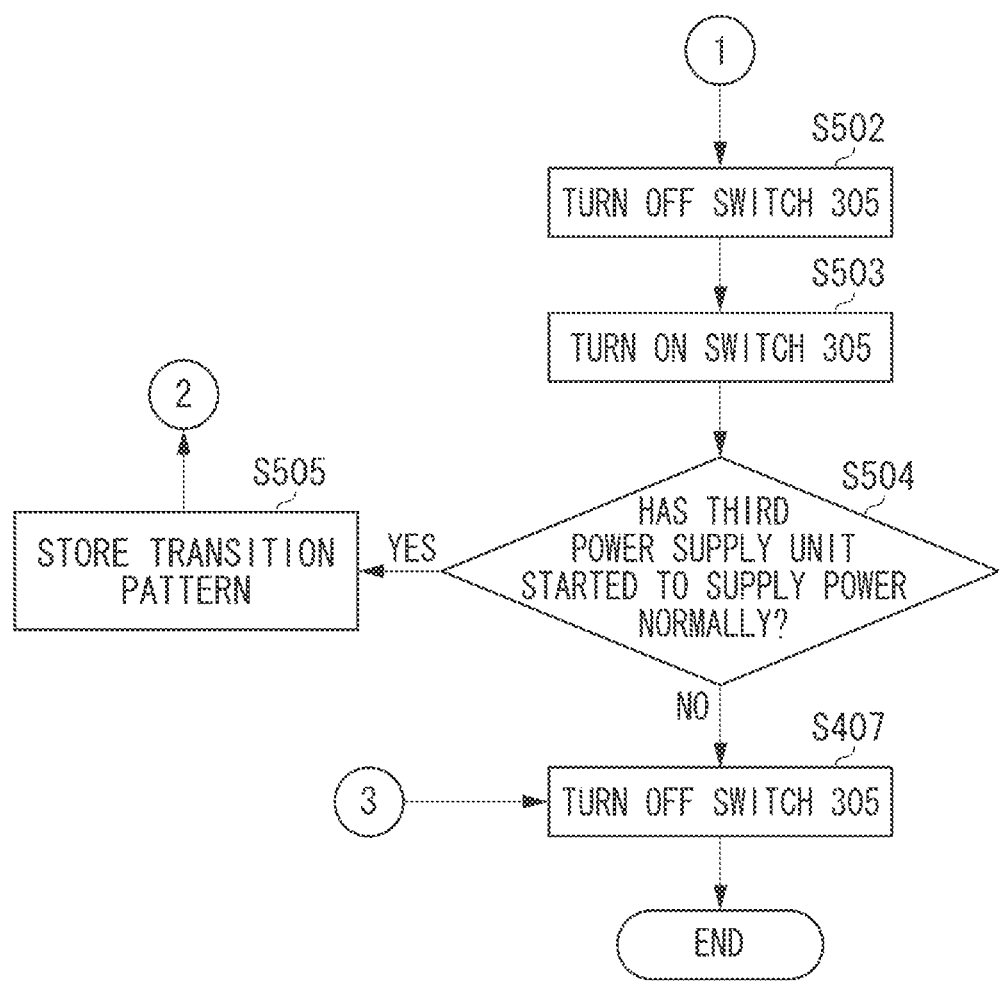
FIG. 5 (consisting of FIGS. 5A and 5B) is a flowchart illustrating a method for controlling an image forming apparatus.

A method for controlling an image forming apparatus according to the present exemplary embodiment will be described with reference to the flowchart illustrated in FIG. 5 (consisting of FIGS. 5A and 5B) instead of FIG. 4. Further, steps S401 to S405 and steps S407 to S411 are similar to those in the first exemplary embodiment.

FIG. 5 is a flowchart illustrating a method for controlling the image forming apparatus according to the present exemplary embodiment. The flowchart illustrates a flow in which the power supply of the whole image forming system is turned on from an off state by the power supply control unit 210 controlling the power supply of the image forming system when the switch 303 is turned on by the user.

In step S501, in a case where the power good signal from the first power supply monitoring unit 308 and the second power supply monitoring unit 309 has transitioned, the pattern of the transition is read, and temporarily stored in an internal temporary storage unit (not illustrated). This temporarily stored transition pattern is deleted when the power supply control unit 210 is reset.

The power supply control unit 210 pre-stores in an internal storage unit (not illustrated) transition patterns of the power good signals from the first power supply monitoring unit 308 and the second power supply monitoring unit 309 that occur during various types of power supply troubles, and whether the power supply trouble with those transition patterns can be automatically fixed. The power supply control unit 210 determines whether the power supply trouble is a trouble that can be fixed automatically by comparing the read power good signal transition pattern and the pre-stored patterns in the cases of power supply troubles that can be automatically fixed.

In a case where it is determined that the power supply trouble detected by the power supply control unit 210 is a power supply trouble that cannot be automatically fixed (NO in step S501), the processing proceeds to step S502. In a case where it is determined that the power supply trouble detected by the power supply control unit 210 is a power supply trouble that can be automatically fixed (YES in step S501), the processing proceeds to step S411.

In step S502, the power supply control unit 210 turns off the switch 305 to turn off the second power supply unit 306 and the third power supply unit 310. In step S503, the power supply control unit 210 keeps the power supply off until charge has been drained from the second power supply unit 306 and the third power supply unit 310. For example, the power supply control unit 210 keeps the switch 305 off while measuring one second with a timer. After the power supply off period has elapsed, the power supply control unit 210 then turns on the switch 305 to turn on again the second power supply unit 306 and the third power supply unit 310.

In step S504, similar to the first time the power supply was turned on, the power supply control unit 210 measures the period of time from when the switch 305 is turned on until when the power good signal from the second power supply monitoring unit 309 is received. In a case where the power supply control unit 210 receives a power good signal from the second power supply monitoring unit 309, and determines that the second power supply unit 306 and the third power supply unit 310 have started up normally (YES in step S504), the processing proceeds to step S505.

In a case where a power good signal from the second power supply monitoring unit 309 is not received within a predetermined period of time after the switch 305 is turned on, the power supply control unit 210 determines that a trouble has occurred in the second power supply unit 306 and the third power supply unit 310, and that this trouble is a power supply trouble that cannot be automatically fixed (NO in step S504), the processing proceeds to step S407.

In step S505, the power supply control unit 210 stores in the internal storage unit (not illustrated) the power good signal transition pattern that was temporarily stored in step S501 as a new transition pattern in the case of a power supply trouble that can be automatic fixed. The term "transition pattern" here refers to a transition pattern specifying a change (change in the monitoring state) in the voltage of the second power supply obtained by monitoring the power supply state of the second power supply unit 306.

According to the above method, when a power supply trouble occurs in an image forming apparatus, the trouble can be automatically fixed in a case where it is a trouble that can be automatically fixed, and in a case where it is a trouble that cannot be automatically fixed, the repetition of a meaningless OFF/ON operation caused by an unnecessary automatic recovery operation can be avoided. Further, when whether a power supply trouble can be fixed automatically is unknown, whether the power supply trouble can be fixed automatically can be determined by performing automatic recovery processing just for one time.

Each of the steps in the exemplary embodiments can be realized by a processing apparatus (CPU or processor) such as a personal computer (computer) executing software (programs) obtained via a network or various storage media.

The above-described exemplary embodiments should not be seen to be limiting. Various modifications (including organic combinations of each of the exemplary embodiments) can be made and these modifications are not excluded from the scope of the present disclosure.

According to the present disclosure, the repetition of an OFF/ON control on a specific power supply unit can be avoided by specifying that a trouble that cannot be automatically fixed has occurred in a power supply unit supplying power to any of the power supply systems.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-247500 filed Nov. 29, 2013, which is hereby incorporated by reference herein in its entirety.

What is claimed is:

1. An information processing apparatus comprising:
   a first ACDC converter which inputs AC power and outputs first DC power;
   a second ACDC converter which inputs AC power and outputs second DC power;
   a DCDC converter which converts the second DC power into third DC power and outputs the third DC power;
   a first monitoring circuit which monitors the third DC power and outputs a power good signal based on that a state of the third DC power;
   a first switch arranged on a primary side of the second ACDC converter;
   a second switch arranged between the second ACDC converter and a load, the second DC power being supplied to the load; and
   a power supply controller which turns on the first switch and then,
   if the power good signal is not input from the first monitoring circuit, turns off the first switch and then turns the first switch back on, and
   if the power good signal is input from the first monitoring circuit, turns on the second switch;
   wherein the power supply controller turns off the first switch but does not turn the first switch back on if the third DC power falls into an abnormal state after the second switch is turned on.

2. The information processing apparatus according to claim 1,
   wherein the power supply controller turns off the first switch and then turns on after a predetermined time elapses if the power good signal is not input from the first monitoring circuit.

3. The information processing apparatus according to claim 1, further comprising: a processor which controls the information processing apparatus; and
   wherein the processor receives the first DC power and the third DC power.

4. The information processing apparatus according to claim 1,
   wherein the power supply controller turns off the first switch and the second switch if the first DC power falls into an abnormal state after the second switch is turned on.

5. The information processing apparatus according to claim 1, further comprising:
   a second monitoring circuit which monitors the first DC power and outputs another power good signal based on a state of the first DC power,
   wherein the power supply controller turns on the second switch in accordance with receiving the another power good signal output from the second monitoring circuit.

6. The information processing apparatus according to claim 1, wherein the load is a printer which prints an image on a sheet.

7. A method for supplying power to an information processing apparatus including a first ACDC converter which inputs AC power and outputs first DC power, a second ACDC which inputs AC power and outputs second DC power, a DCDC converter which converts the second DC power into third DC power and outputs the third DC power; a first monitoring circuit which monitors the third DC power and outputs a power good signal based on that a state of the third DC power; a first switch arranged on a primary side of the second ACDC converter; a second switch arranged between the second ACDC converter and a load, the second DC power being supplied to the load, the method comprising:
   turning on, by a power supply controller, the first switch then,
   if the power good signal is not input from the first monitoring circuit, turns off the first switch and then turns the first switch back on, and
   if the power good signal is input from the first monitoring circuit, turns on the second switch; and
   turning off, by the power supply controller, the first switch but does not turn the first switch back on if the third DC power falls into an abnormal state after the second switch is turned on.

8. The method according to claim 7, wherein the power supply controller turns off the first switch and then turns on after a predetermined time elapses if the power good signal is not input from the first monitoring circuit.

9. The method according to claim 7, further comprising, controlling, by a processor,
   the information processing apparatus; and
   wherein the processor receives the first DC power and the third DC power.

10. The method according to claim 7, further comprising, turning off, by the power supply controller, the first switch and second switch if the first DC power falls into an abnormal state after the second switch is turned on.

11. The method according to claim 7, wherein the information processing apparatus further includes,
    a second monitoring circuit which monitors the first DC power and outputs another power good signal based on a state of the first DC power, and
    wherein, the power supply controller, turns on the second switch in accordance with receiving the another power good signal output from the second monitoring circuit.

12. The method according to claim 7, wherein the load is a printer which prints an image on a sheet.

13. An information processing apparatus comprising:
    an ACDC converter which inputs AC power and outputs first DC power;
    a DCDC converter which converts the first DC power into second DC power and outputs the second DC power;
    a first monitoring circuit which monitor the second DC power and outputs a power good signal based on that a state of the second DC power;
    a first switch arranged on a primary side of the ACDC converter;
    a second switch arranged between the ACDC converter and a load, the first DC power being supplied to the load; and
    a power supply controller which turns on the first switch and then,
    if the power good signal is not input from the first monitoring circuit, turns off the first switch and then turns the first switch back on, and
    if the power good signal is input from the first monitoring circuit, turns on the second switch;
    wherein the power supply controller turns off the first switch but does not turn the first switch back on if the second DC power falls into an abnormal state after the second switch is turned on.

14. The information processing apparatus according to claim 13,
    wherein the power supply controller, if the power good signal is not input from the first monitoring circuit within predetermined time after the power supply controller has turned on the first switch, turns off the first switch and then turns on the first switch.

15. The information processing apparatus according to claim 13, wherein the power supply controller turns off the first switch and does not turn the first switch back on if the second DC power falls into an abnormal state after the power supply controller turns on the first switch.

16. The information processing apparatus according to claim 13, wherein the load is a printer which prints an image on a sheet.

* * * * *